United States Patent [19]
Lee

[11] Patent Number: 5,706,284
[45] Date of Patent: Jan. 6, 1998

[54] METHOD FOR ESTABLISHING COMMUNICATION PATH BETWEEN MOBILE STATIONS

[75] Inventor: Yong-Ho Lee, Suwon, Rep. of Korea

[73] Assignee: SamSung Electronics Co., Ltd., Kyungki-do, Rep. of Korea

[21] Appl. No.: 626,064

[22] Filed: Apr. 1, 1996

[30] Foreign Application Priority Data

Mar. 31, 1995 [KR] Rep. of Korea ............... 7535/1995

[51] Int. Cl.$^6$ ........................................ H04J 3/06
[52] U.S. Cl. ................. 370/324; 370/503; 379/59; 455/33.1
[58] Field of Search .................. 370/503, 507, 370/509, 510, 512, 514, 389, 395, 310, 312, 313, 324, 329, 330, 331, 341, 349, 468, 471, 475, 480, 320, 335, 342; 455/33.1–33.4, 54.2, 56.1, 57.1, 13.2, 38.1, 51.1, 54.1; 375/362, 363, 360, 365, 200, 202, 205; 379/58–63

[56] References Cited

U.S. PATENT DOCUMENTS

| | | | |
|---|---|---|---|
| 5,093,924 | 3/1992 | Toshiyuki et al. | 455/33.1 |
| 5,245,610 | 9/1993 | Lindell | 455/54.2 |
| 5,301,357 | 4/1994 | Thompson | 455/33.4 |
| 5,390,216 | 2/1995 | Bilitza et al. | 370/328 |
| 5,408,679 | 4/1995 | Masuda | 455/11.1 |
| 5,544,155 | 8/1996 | Lucas et al. | 370/203 |

*Primary Examiner*—Dang Ton
*Attorney, Agent, or Firm*—Robert E. Bushnell, Esq.

[57] ABSTRACT

An exemplary embodiment of the present invention provides a method for establishing a communication path between a first mobile station and a second mobile station both positioned within an operating region of a base station in a cordless communication system. According to the embodiment, subbands are first checked to determine whether an available subband within an auxiliary communication band exists. When an available subband exists, a synchronization packet is transmitted from the first mobile station to the second mobile station using an initial synchronization frequency. In response to receipt of the synchronization packet by the second mobile station, a synchronization identification packet is transmitted from the second mobile station to the first mobile station. The synchronization identification packet is received at the first mobile station, and then a signalling process between the second mobile station and the first mobile station is performed using a leaping pattern indicated by the synchronization packet, to thereby establish the communication path.

24 Claims, 6 Drawing Sheets

| PACKET ID | TIME & PRIORITY INFORMATION | TRANSMITTER'S TELEPHONE NUMBER | RECEIVER'S TELEPHONE NUMBER | BAND TO BE USED | LEAP NUMBER | x | CHECK-SUM |

Fig. 4A

| PACKET ID | TIME & PRIORITY INFORMATION | TRANSMITTER'S TELEPHONE NUMBER | RECEIVER'S TELEPHONE NUMBER | x | CHECK-SUM |

METHOD FOR ESTABLISHING COMMUNICATION PATH BETWEEN MOBILE STATIONS

CROSS-REFERENCE TO RELATED APPLICATIONS

This application makes reference to, incorporates the same herein, and claims all benefits accruing under 35 U.S.C. §119 arising from an application for *Method For Establishing Communication Path Between Mobile Stations* earlier filed in the Korean Industrial Property Office on 31 Mar. 1995 and there duly assigned Ser. No. 7535/1995.

BACKGROUND OF THE INVENTION

The present invention relates to a cordless communication method, and more particularly, to a method for establishing a communication path between mobile stations using frequency leaping.

In a cordless communication system having a base station and a plurality of corresponding mobile stations, frequency control is necessary to ensure proper transmission and reception of signals among the various stations.

One example of contemporary efforts aimed at providing frequency stability for signals transmitted by a plurality of mobile stations to an associated base station is found in U.S. Pat. No. 5,245,610 entitled *Digital Radio Mobile Frequency Supervision*, and issued to Lindell on 14 Sep. 1993. In Lendell '610, signals received from the mobile stations are compared to a reference signal, and a difference signal is accordingly generated. Depending upon the magnitude of the difference signal, a mobile station may be summoned for a service adjustment or disabled from further communication. While conventional art, such as Mar. 28, 1996 Lindell '610, possesses merit in its own right, I note that it fails to adequately address the problem of frequency jamming that often occurs when two mobile stations are communicating directly.

The direct communication operation between mobile stations is typically based on a frequency division method. Thus, a first mobile station transmits a fixed frequency, and a second mobile station detects and receives the frequency over an assigned bandwidth as the fixed frequency is transmitted from the first mobile station. This method is easily implemented and enhances frequency availability. In a cordless environment, however, communication quality may be significantly reduced and a communication path may be interrupted, due to intended or unintended jamming with respect to the corresponding frequency. The present invention is directed at solving this deficiency in the prior art.

SUMMARY OF THE INVENTION

Therefore, it is an object of the present invention to provide an improved method for establishing a direct communication path between mobile stations in a cordless communication system.

It is another object to provide a method for establishing a direct communication path between mobile stations in a cordless communication system, whereby a communication state between the mobile stations can be effectively maintained for a constant time period using a frequency leaping method.

It is still another object to provide a method for establishing a direct communication path between mobile stations in a cordless communication system that minimizes frequency jamming within a specific frequency band.

It is yet another object to provide a method for establishing a direct communication path between mobile stations in a cordless communication system that avoids communication interruption and delay.

To achieve these and other objects, a first embodiment of the present invention provides a method for establishing a communication path between a first mobile station and a second mobile station both positioned within an operating region of a base station in a cordless communication system. According to the first embodiment, subbands are first checked to determine whether an available subband within an auxiliary communication band exists. When an available subband exists, a synchronization packet is transmitted from the first mobile station to the second mobile station using an initial synchronization frequency. In response to receipt of the synchronization packet by the second mobile station, a synchronization identification packet is transmitted from the second mobile station to the first mobile station. The synchronization identification packet is received at the first mobile station, and then a signalling process between the second mobile station and the first mobile station is performed using a leaping pattern indicated by the synchronization packet, to thereby establish the communication path.

A second embodiment of the present invention provides a method for establishing a communication path between a first mobile station positioned within an operating region of a base station and a second mobile station positioned outside the operating region of the base station in a cordless communication system. According to the second embodiment, the first mobile station checks subbands within an auxiliary communication band to determine whether an available subband exists. The second mobile station detects an initial synchronization frequency from among a plurality of network communication bands and the auxiliary communication band. A synchronization packet is transmitted from the first mobile station to the second mobile station using the initial synchronization frequency when an available subband exists. The second mobile station receives the synchronization packet, identifies a corresponding leap frequency from the synchronization packet, and then transmits a synchronization identification packet from the second mobile station to the first mobile station. The first mobile station receives the synchronization identification packet, and a signalling process between the first mobile station and the second mobile station is performed using a leaping pattern determined from the leap frequency, to thereby establish the communication path.

A third embodiment of the present invention provides a method for establishing a communication path between a first mobile station positioned outside an operating region of a base station and a second mobile station positioned within the operating region of the base station in a cordless communication system. According to the third embodiment, the first mobile station selects a leaping pattern to enable generation of a leap frequency, and the second mobile station checks subbands within an auxiliary communication band. A synchronization packet is transmitted from the first mobile station to the second mobile station using an initial synchronization frequency. The second mobile station receives the synchronization packet, and transmits a synchronization identification packet to the first mobile station in response to receipt of the synchronization identification packet. The first mobile station receives the synchronization identification packet, determines that leaping will be performed among the subbands when the second mobile station transmits the synchronization identification packet to the fast mobile station using the subbands, and alternatively determines that leaping will be performed among a plurality of network communication bands and the auxiliary communication band when the second mobile station does not transmit the synchronization identification packet to the first mobile station using the subbands. A signalling process between the first mobile station and the second mobile station is then performed using the leaping pattern, to thereby establish the communication path.

A fourth embodiment of the present invention provides a method for establishing a communication path between a first mobile station and a second mobile station both positioned outside an operating region of a base station in a cordless communication system.ccording to the fourth embodiment, the first mobile station selects a leaping pattern to enable generation of a leap frequency, and the second mobile station detects an initial synchronization frequency from among a plurality of network communication bands and an auxiliary communication band. A synchronization packet is transmitted from the first mobile station to the second mobile station using the initial synchronization frequency. The second mobile station receives the synchronization packet, identifies the leap frequency from the synchronization packet, and then transmits a synchronization identification packet to the first mobile station. The first mobile station receives the synchronization identification packet, determines that leaping will be performed among subbands of the auxiliary communication band when the second mobile station transmits the synchronization identification packet to the first mobile station using the subbands, and determines that leaping will be performed among the plurality of network communication bands and the auxiliary communication band when the second mobile station does not transmit the synchronization identification packet to the first mobile station using said subbands. A signalling process between said first mobile station and said second mobile station is then performed using the leaping pattern, to thereby establish the communication path.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
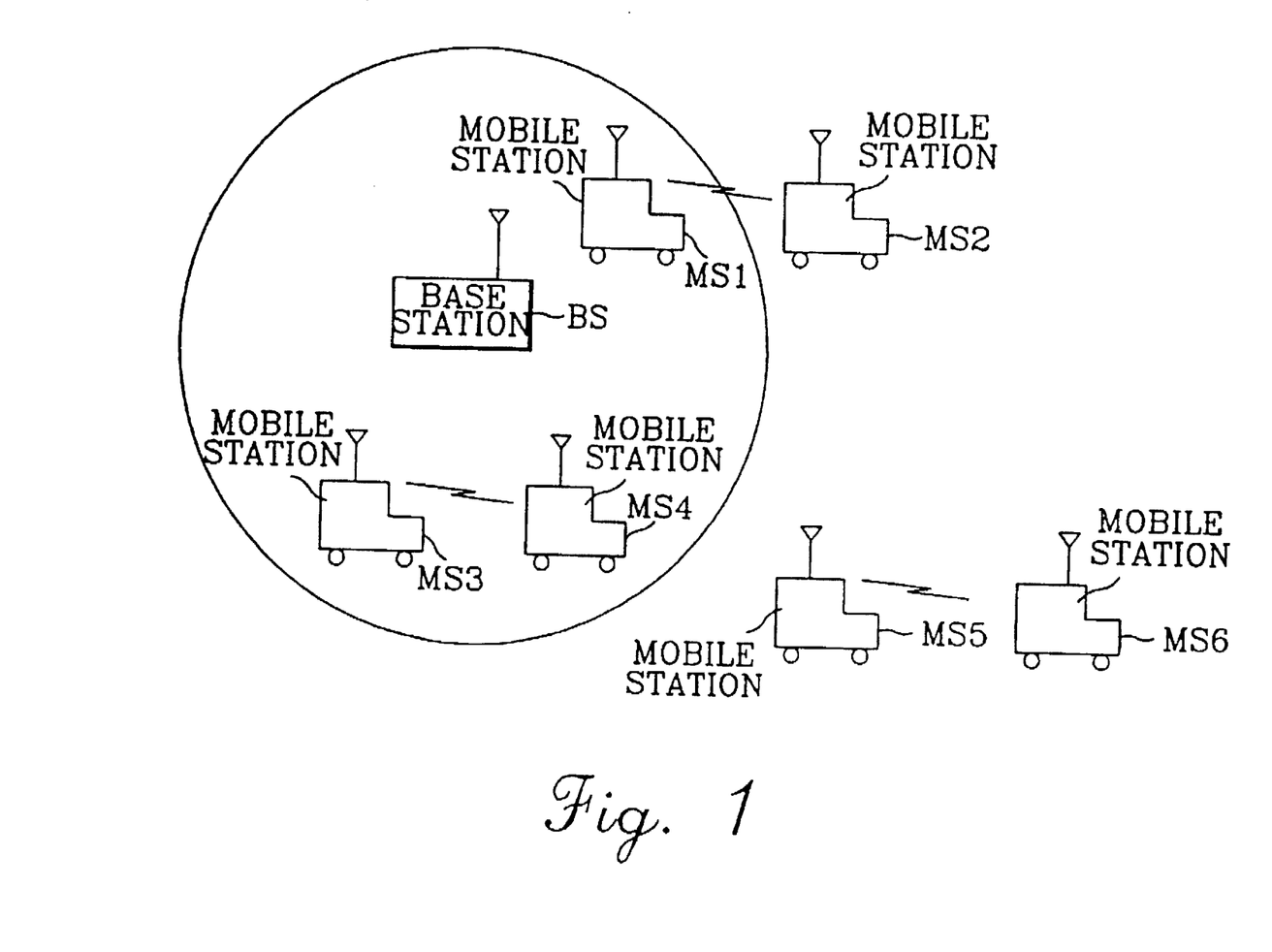
FIG. 1 illustrates a direct communication operation between mobile stations.

Turning now to the drawings and referring to FIG. 1, a direct communication operation between mobile stations is depicted. The network configuration of FIG. 1 includes a base station BS having a corresponding operating region (as indicated by the circle), and a plurality of mobile stations MS1–MS6. Mobile stations MS1–MS6 are used to represent three distinct operating scenarios addressed in the present invention. Mobile stations MS1 and MS2 represent a communication operation where one mobile station is within the operating region of base station BS, and the other mobile station is outside the operating region of base station BS. Mobile stations MS3 and MS4 represent a communication operation where both mobile stations are within the operating region of base station BS. Mobile stations MS5 and MS6 represent a communication operation where both mobile stations are outside the operating region of base station BS. In the following detailed description, a mobile station that initiates communication is referred to as a "transmitting mobile station", and a mobile station being contacted is referred to as a "receiving mobile station". These designations are used for convenience only, and are not intended to represent that a given mobile station can only transmit or receive information. That is, it can be properly assumed that all mobile stations can both transmit and receive information.

Figure 2:
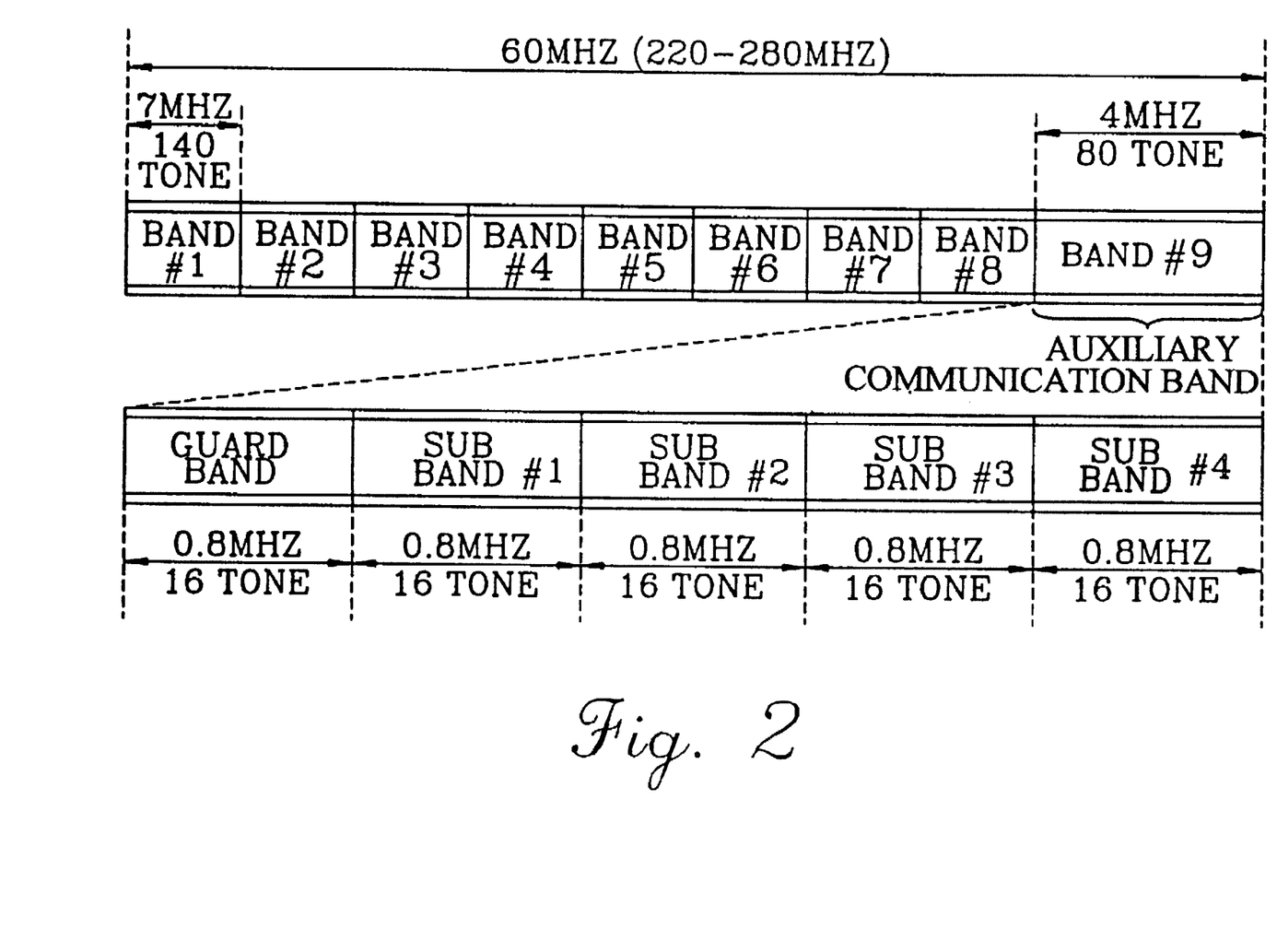
FIG. 2 illustrates a frequency format used for direct communication according to the principles of the present invention.

FIG. 2 illustrates an exemplary frequency format used for direct communication according to the principles of the present invention. In FIG. 2, a predetermined frequency bandwidth of 60 MHz (e.g., 220–280 MHz in a preferred embodiment) is divided into a plurality of contiguous frequency bands, namely band #1 through band #9. Band #1 through band #8 are referred to network communication bands, and each occupies a 7 MHz band of frequencies (i.e., 140 tones). Band #9 is referred to as an auxiliary communication band, and occupies a 4 MHz band of frequencies (i.e., 80 tones). Band #9 is divided into four subbands, namely subband #1 through subband #4, and a guard band, each occupying a 0.8 MHz band of frequencies (i.e., 16 tones). The guard band is included for reducing signal interference with an adjacent network communication band, namely band #8, and the four subbands are for actual direct communication. Any 16 tones are allocated for establishing an initial synchronization frequency within the four subbands. This enables timely transmission of a synchronization packet to define a leaping pattern based on time information, and also enables timely transmission of a synchronization identification packet used to establish the initial synchronization. In FIG. 2, the channel interval within each band is set to 50 KHz. For instance, band #9 is divided into 80 tones, wherein 16 tones are allocated for initial synchronization and 48 tones are allocated for direct communication.

Figure 3:
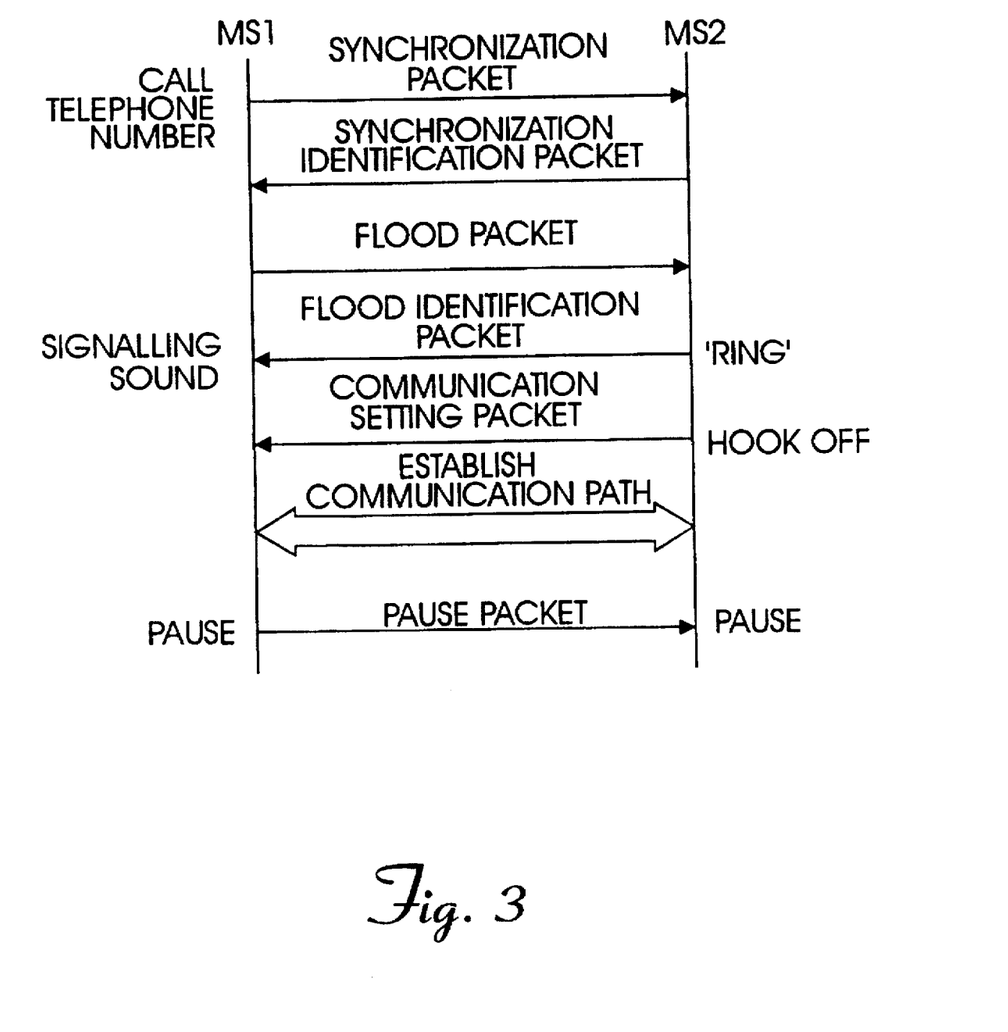
FIG. 3 illustrates a signalling process for establishing a direct communication path according to the principles of the present invention.

FIG. 3 illustrates a signalling process for establishing a direct communication path according to the principles of the present invention. This signalling process corresponds to step 5f in FIG. 5A, and is disclosed in FIG. 3 along with other steps of the present invention which will be described hereinafter. In FIG. 3, a transmitting mobile station (e.g., MS1) that initiates communication calls a telephone number corresponding to a receiving mobile station (e.g., MS2). Transmitting mobile station MS1 then transmits a synchronization packet to receiving mobile station MS2. In response to receipt of the synchronization packet, receiving mobile station MS2 transmits a synchronization identification packet to transmitting mobile station MS1. After receiving the synchronization identification packet from receiving mobile station MS2, transmitting mobile station MS1 begins the signalling process by transmitting a flood packet to receiving mobile station MS2. In response to receipt of the flood packet, a ring signal is generated at receiving mobile station MS2, and a flood identification packet is transmitted back to transmitting mobile station MS1, thereby generating a call signalling sound at transmitting mobile station MS1. When receiving mobile station MS2 answers the incoming call by performing an off-hook operation, a communication setting packet is transmitted to transmitting mobile station MS1 from receiving mobile station MS2. The signalling process, which is performed using a selected frequency leaping pattern, is then completed. In response to the signalling process, a communication path between transmitting mobile station MS1 and receiving mobile station MS2 is established (i.e., step 5g in FIG. 5A), and a pause packet is transmitted to receiving mobile station MS2 from transmitting mobile station MS1 (i.e., step 5h in FIG. 5A).

Figure 4A:
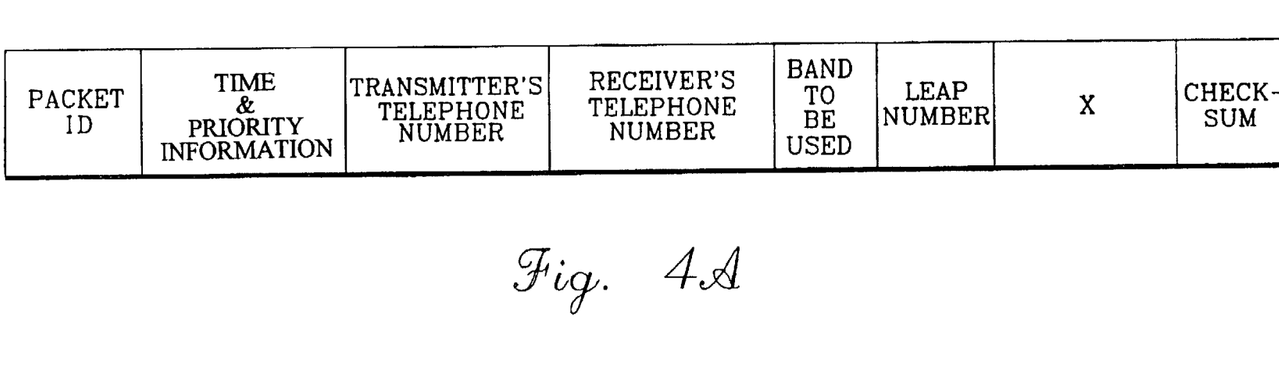
FIGS. 4A and 4B illustrate formats of information packets used to provide direct communication according to the principles of the present invention.
Figure 4B:
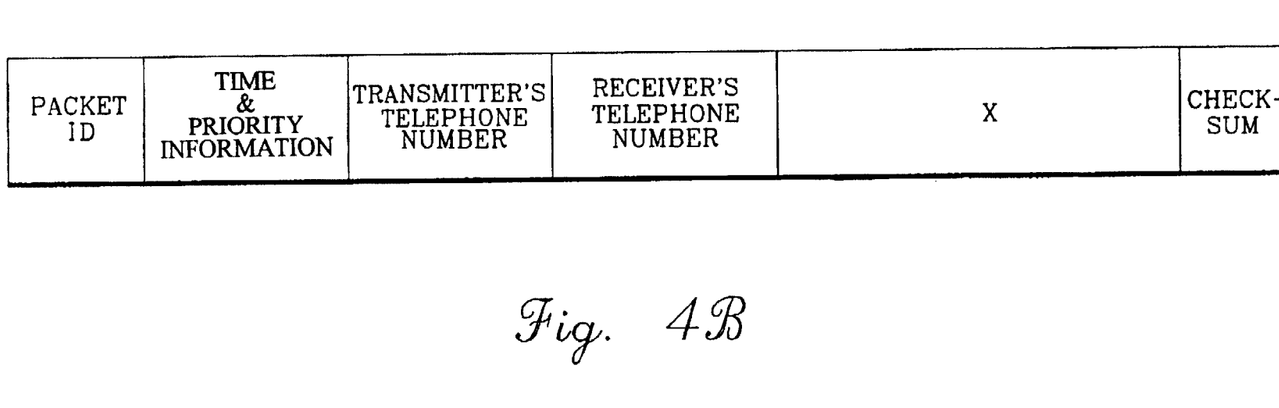

FIGS. 4A and 4B illustrate formats of information packets used to provide direct communication according to the principles of the present invention. FIG. 4A, which illustrates the format of the synchronization packet, includes: a packet identification (ID), time and priority information, a transmitter's telephone number, a receiver's telephone number, a band to be used, a leap number, a redundancy region (X) and a checksum. FIG. 4B, which illustrates the format of the synchronization identification packet, the flood packet, the flood identification packet, the communication setting packet and the pause packet, includes: a packet identification (ID), time and priority information, a transmitter's telephone number, a receiver's telephone number, a redundancy region (X) and a checksum.

Figure 5A:
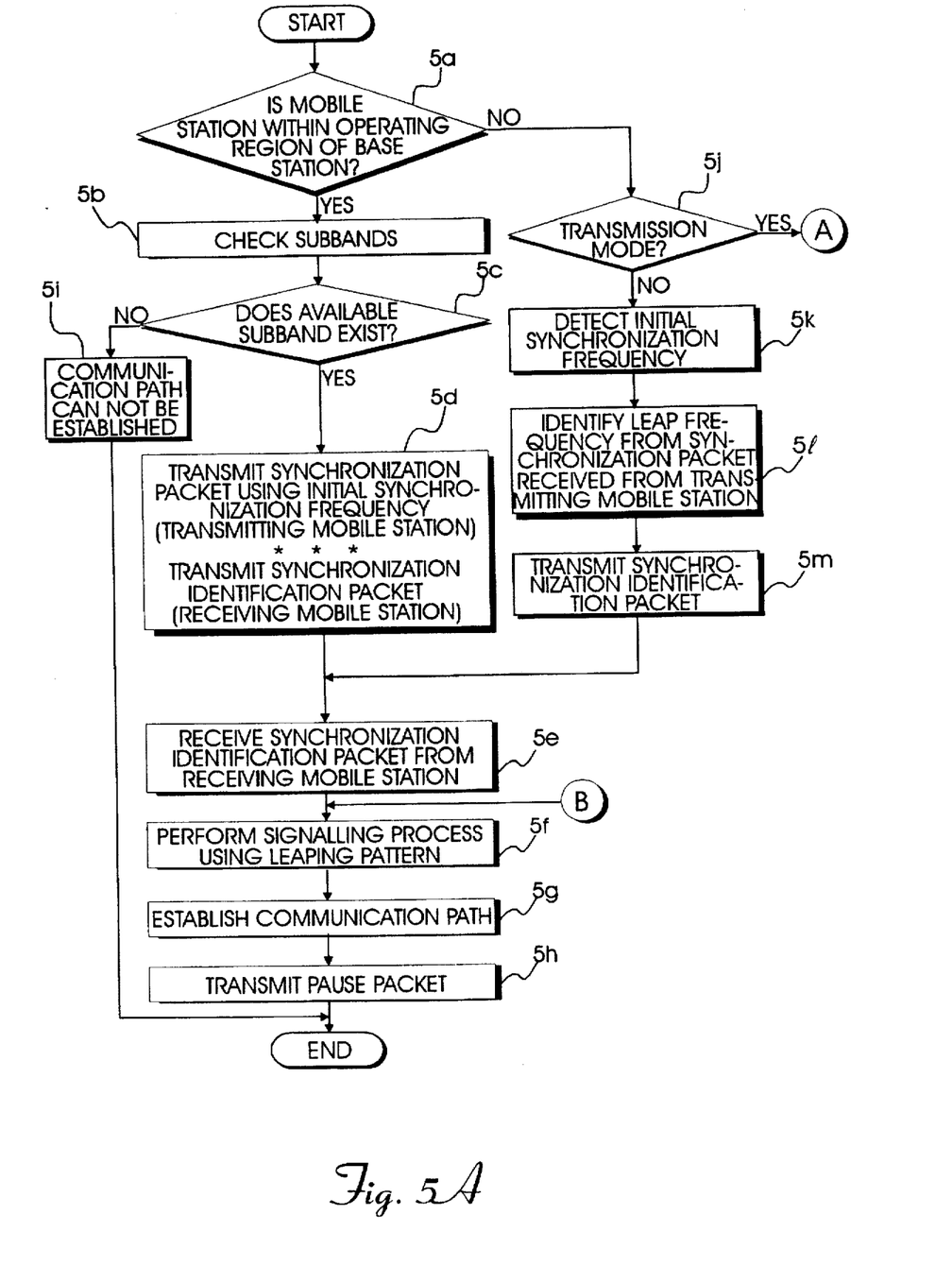
FIGS. 5A and 5B are flowcharts illustrating a method for establishing the direct communication path between mobile stations according to the principles of the present invention.
Figure 5B:
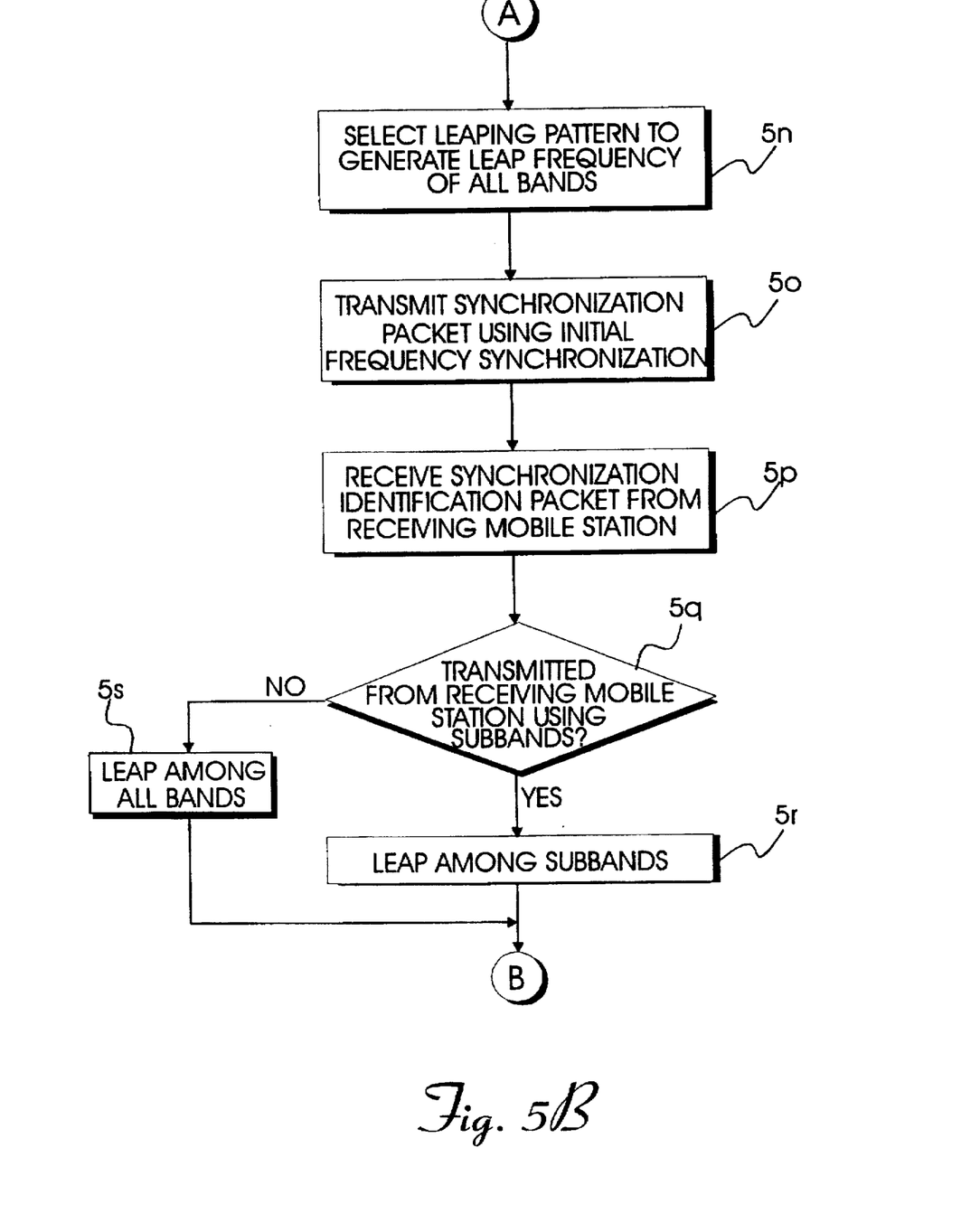

FIGS. 5A and 5B are flowcharts illustrating a method for establishing the communication path between mobile stations in a cordless communication system according to the principles of the present invention.

First, the communication operation where both mobile stations are within the operating region of base station BS will be described. In step 5a, a determination is made as to whether a given mobile station is within the operating region of base station BS. In this scenerio, since both mobile stations are within the operating region base station BS, the mobile stations check all of the subbands within the auxiliary communication band prior to an attempt of direct communication, in step 5b, to thereby determine whether or not an available subband exists, in step 5c. If all subbands are occupied, direct communication is prohibited and the communication path can not be established, in step 5i. If an available subband does exists, however, transmitting mobile station MS3 transmits a synchronization packet to the receiving mobile station MS4 using an initial synchronizing frequency, in step 5d. As indicated by FIG. 4A, the synchronization packet includes information from which a leaping pattern can be determined. In response to receipt of the synchronization packet, receiving mobile station MS4 transmits a synchronization identification packet for receipt by transmitting mobile station MS4, in step 5e. The signalling process between the two mobile stations, as described in conjunction with FIG. 3, is then performed using the leaping pattern indicated by the synchronization packet, in step 5f. The communication path is accordingly established, in step 5g, and the pause packet having a format as represented in FIG. 4B to transmitted to receiving mobile station MS4, in step 5h.

Next, the communication operation where one mobile station is within the operating region of base station BS, and the other mobile station is outside the operating region of base station BS will be described. In this scenerio, first assume that the mobile station MS1 within the operation region of base station BS is operating as the transmitting mobile station, and that mobile station MS2 outside the operating region of base station BS is operating as the receiving mobile station. In this situation, transmitting mobile station MS1 within the operating region of base station BS checks all of the subbands within the auxiliary communication band prior to an attempt of direct communication, in step 5b, to thereby determine whether or not an available subband exists, in step 5c. During this time, receiving mobile station MS2, which is determined not to be in the transmission mode in step 5j, detects the initial synchronization frequency from among all of the bands, that is, the network communication bands and the auxiliary communication band, in step 5k. Within the auxiliary communication band, only 16 tones are used for detection of the initial synchronization frequency. If receiving mobile station MS2 moves within the operating region of base station BS, the initial synchronization frequency is detected from the network communication bands. If an available subband does exists, transmitting mobile station MS1 then transmits the synchronization packet to receiving mobile station MS2 using the initial synchronization frequency, in step 5d. In response to receipt of the synchronization packet, receiving mobile station MS2 identifies a leap frequency from which the leaping pattern can be determined, in step 5l. Then, in step 5m, receiving mobile station MS2 transmits the synchronization identification packet to transmitting mobile station MS1. Transmitting mobile station MS1 receives the synchronization identification packet from receiving mobile station MS 2, in step 5e. Thereafter, the signalling process of FIG. 3 is performed using the identified leaping pattern, in step 5f, the communication path is established, in step 5g, and the pause packet is transmitted from transmitting mobile station MS1, in step 5h, as described previously.

Similarly, when mobile station MS1 within the operation region of base station BS is operating as the receiving mobile station, and mobile station MS2 outside the operating region of base station BS is operating as the transmitting mobile station, the present invention is executed as follows. First, transmitting mobile station MS2 outside the operating region of base station BS selects the leaping pattern to thereby generate the leap frequency corresponding to all bands, in step 5n. During this time, receiving mobile station MS1 within the operating region of base station BS checks all of the subbands within the auxiliary communication band, in step 5b. Transmitting mobile station MS2 then transmits the synchronization packet to receiving mobile station MS1 using the initial synchronization frequency, in step 5o. In response to receipt of the synchronization packet, receiving mobile station MS1 transmits the synchronization identification packet to transmitting mobile station MS2, in step 5d. Transmitting mobile station MS2 receives the synchronization identification packet from receiving mobile station MS1, in step 5p, and then determines whether the synchronization identification packet was transmitted from receiving mobile station MS1 using subbands within the auxiliary communication band, in step 5q. If the synchronization identification packet was transmitted using subbands, then leaping will be performed among the subbands, according to step 5r. Alternatively, if the synchronization identification packet was not transmitted using subbands, then leaping will be performed among all bands, according to step 5s. Next, the signalling process is performed using the applicable leaping pattern, in step 5f, the communication path is established, in step 5g, and the pause packet is transmitted from transmitting mobile station MS2; in step 5h, as described previously.

Finally, the communication operation where both mobile stations are outside the operating region of base station BS will be described. In this situation, transmitting mobile station MS5 and receiving mobile station MS6 both positioned outside the operating region of base station BS establish initial synchronization through steps 5n through 5s and steps 5k through 5m, respectively. That is, transmitting mobile station MS5 performs steps 5n through 5s, and receiving mobile station MS6 performs steps 5k through 5m. In this situation, there is virtually no limit to the number of subscribers who can communicate directly. The operational sequence between the two mobile stations is as follows.

In step 5n, transmitting mobile station MS5 selects a leaping pattern to thereby generate the leap frequency corresponding to all bands. Transmitting mobile station MS5 then transmits the synchronization packet to receiving mobile station MS6 using the initial synchronization frequency, in step 5o. Receiving mobile station MS6, having detected the initial synchronization frequency from among all of the bands, in step 5k, identifies the leap frequency from the synchronization packet received from transmitting mobile station MS5, in step 5l. In response to receipt of the synchronization packet, receiving mobile station MS6 transmits the synchronization identification packet to transmitting mobile station MS5, in step 5m. Transmitting mobile station MS5 receives the synchronization identification packet from receiving mobile station MS6, in step 5p, and then determines whether the synchronization identification packet was transmitted from receiving mobile station MS6 using subbands within the auxiliary communication band, in step 5q. If the synchronization identification packet was transmitted using subbands, then leaping will be performed among the subbands, according to step 5r. Alternatively, if the synchronization identification packet was not transmitted using subbands, then leaping will be performed among all bands, according to step 5s. Next, the signalling process of FIG. 3 is performed using the applicable leaping pattern, in step 5f, the communication path is established, in step 5g, and the pause packet is transmitted from transmitting mobile station MS5, in step 5h, as described previously.

As described above, the present invention utilizes a frequency leaping method for leaping within the auxiliary communication band allocated by each constant time period to reduce jamming for a specific frequency, thereby minimizing signalling and communication interruption and delay. Accordingly, a communication state can be effectively maintained for a constant time period.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for establishing a communication path between a first mobile station and a second mobile station both positioned within an operating region of a base station in a cordless communication system, said method comprising the steps of:

detecting subbands to determine whether an available subband within an auxiliary communication band exists;

transmitting a synchronization packet from said first mobile station to said second mobile station using an initial synchronization frequency when said available subband exists;

transmitting a synchronization identifcation packet from said second mobile station to said first mobile station in response to receipt of said synchronization packet by said second mobile station; and     receiving said synchronization identification packet at said first mobile station, and then performing a signalling process between said second mobile station and said first mobile station using a leaping pattern indicated by said synchronization packet to establish said communication path.

2. The method as claimed in claim 1, wherein said signalling process comprises the steps of:

transmitting a flood packet from said first mobile station to said second mobile station in response to receipt of said synchronization identification packet by said first mobile station;

generating a ring signal at said second mobile station, and transmitting a flood identification packet to said first mobile station in response to receipt of said flood packet by said second mobile station;

generating a call signalling sound at said first mobile station in response to receipt of said flood identification packet by said first mobile station; and     transmitting a communication setting packet from said second mobile station to said first mobile station when a hook-off state is detected in said second mobile station.

3. The method as claimed in claim 1, wherein said auxiliary communication band comprises a guard band for reducing signal interference with an adjacent band, and four subbands for direct communication.

4. The method as claimed in claim 3, wherein any 16 tones are allocated for said initial synchronization frequency within each said subband to enable determination of said leaping pattern based on time information.

5. The method as claimed in claim 1, wherein said synchronization packet comprises a packet identification, time and priority information, a transmitter's telephone number, a receiver's telephone number, bands to be used, a leap number, a redundancy region and a check sum.

6. The method as claimed in claim 1, wherein said synchronization identification packet, said flood packet, said flood identification packet, said communication setting packet and said pause packet each comprises: a packet identification, time and priority information, a transmitter's telephone number, a receiver's telephone number, a redundancy region and a check sum.

7. A method for establishing a communication path between a first mobile station positioned within an operating region of a base station and a second mobile station positioned outside said operating region of said base station in a cordless communication system, said method comprising the steps of:

checking, via said first mobile station, subbands within an auxiliary communication band to determine whether an available subband exists;

detecting, via said second mobile station, an initial synchronization frequency from among a plurality of network communication bands and said auxiliary communication band;

transmitting a synchronization packet from said first mobile station to said second mobile station using said initial synchronization frequency when said available subband exists;

receiving said synchronization packet at said second mobile station, identifying a corresponding leap frequency from said synchronization packet, and then transmitting a synchronization identification packet from said second mobile station to said first mobile station; and receiving said synchronization identification packet at said first mobile station, and performing a signalling process between said first mobile station and said second mobile station using a leaping pattern determined from said leap frequency to establish said communication path.

8. The method as claimed in claim 7, wherein said signalling process comprises the steps of:

transmitting a flood packet from said first mobile station to said second mobile station in response to receipt of said synchronization identification packet by said first mobile station;

generating a ring signal at said second mobile station, and transmitting a flood identification packet to said first mobile station in response to receipt of said flood packet by said second mobile station;

generating a call signalling sound at said first mobile station in response to receipt of said flood identification packet by said first mobile station; and transmitting a communication setting packet from said second mobile station to said first mobile station when a hook-off state is detected in said second mobile station.

9. The method as claimed in claim 7, wherein said auxiliary communication band comprises a guard band for reducing signal interference with an adjacent said network communication band, and four subbands for direct communication.

10. The method as claimed in claim 9, wherein any 16 tones are allocated for said initial synchronization frequency within each said subband to enable determination of said leaping pattern based on time information.

11. The method as claimed in claim 7, wherein said synchronization packet comprises a packet identification, time and priority information, a transmitter's telephone number, a receiver's telephone number, bands to be used, a leap number, a redundancy region and a check sum.

12. The method as claimed in claim 7, wherein said synchronization identification packet, said flood packet, said flood identification packet, said communication setting packet and said pause packet each comprises: a packet identification, time and priority information, a transmitter's telephone number, a receiver's telephone number, a redundancy region and a check sum.

13. A method for establishing a communication path between a first mobile station positioned outside an operating region of a base station and a second mobile station positioned within said operating region of said base station in a cordless communication system, said method comprising the steps of:

selecting, via said first mobile station, a leaping pattern to enable generation of a leap frequency;

checking, via said second mobile station, subbands within an auxiliary communication band;

transmitting a synchronization packet from said first mobile station to said second mobile station using an initial synchronization frequency;

receiving said synchronization packet at said second mobile station, and transmitting a synchronization identification packet from said second mobile station to said first mobile station in response to receipt of said synchronization identification packet by said second mobile station;

receiving said synchronization identification packet at said first mobile station, determining that leaping will be performed among said subbands when said second mobile station transmits said synchronization identification packet to said first mobile station using said subbands, and determining that said leaping will be performed among a plurality of network communication bands and said auxiliary communication band when said second mobile station does not transmit said synchronization identification packet to said first mobile station using said subbands; and performing a signalling process between said first mobile station and said second mobile station using said leaping pattern to establish said communication path.

14. The method as claimed in claim 13, wherein said signalling process comprises the steps of:

transmitting a flood packet from said first mobile station to said second mobile station in response to receipt of said synchronization identification packet by said first mobile station;

generating a ring signal at said second mobile station, and transmitting a flood identification packet to said first mobile station in response to receipt of said flood packet by said second mobile station;

generating a call signalling sound at said first mobile station in response to receipt of said flood identification packet by said first mobile station; and transmitting a communication setting packet from said second mobile station to said first mobile station when a hook-off state is detected in said second mobile station.

15. The method as claimed in claim 13, wherein said auxiliary communication band comprises a guard band for reducing signal interference with an adjacent said network communication band, and four subbands for direct communication.

16. The method as claimed in claim 15, wherein any 16 tones are allocated for said initial synchronization frequency within each said subband to enable determination of said leaping pattern based on time information.

17. The method as claimed in claim 13, wherein said synchronization packet comprises a packet identification, time and priority information, a transmitter's telephone number, a receiver's telephone number, bands to be used, a leap number, a redundancy region and a check sum.

18. The method as claimed in claim 13, wherein said synchronization identification packet, said flood packet, said flood identification packet, said communication setting packet and said pause packet each comprises: a packet identification, time and priority information, a transmitter's telephone number, a receiver's telephone number, a redundancy region and a check sum.

19. A method for establishing a communication path between a first mobile station and a second mobile station both positioned outside an operating region of a base station in a cordless communication system, said method comprising the steps of:

selecting, via said first mobile station, a leaping pattern to enable generation of a leap frequency;

detecting, via said second mobile station, an initial synchronization frequency from among a plurality of network communication bands and an auxiliary communication band;

transmitting a synchronization packet from said first mobile station to said second mobile station using said initial synchronization frequency;

receiving said synchronization packet at said second mobile station, identifying said leap frequency from said synchronization packet, and then transmitting a synchronization identification packet from said second mobile station to said first mobile station;

receiving said synchronization identification packet at said first mobile station, determining that leaping will be performed among subbands of said auxiliary communication band when said second mobile station transmits said synchronization identification packet to said first mobile station using said subbands, and determining that said leaping will be performed among said plurality of network communication bands and said auxiliary communication band when said second mobile station does not transmit said synchronization identification packet to said first mobile station using said subbands; and performing a signalling process between said first mobile station and said second mobile station using said leaping pattern to establish said communication path.

20. The method as claimed in claim 19, wherein said signalling process comprises the steps of:

transmitting a flood packet from said first mobile station to said second mobile station in response to receipt of said synchronization identification packet by said first mobile station;

generating a ring signal at said second mobile station, and transmitting a flood identification packet to said first mobile station in response to receipt of said flood packet by said second mobile station;

generating a call signalling sound at said first mobile station in response to receipt of said flood identification packet by said first mobile station; and transmitting a communication setting packet from said second mobile station to said first mobile station when a hook-off state is detected in said second mobile station.

21. The method as claimed in claim 19, wherein said auxiliary communication band comprises a guard band for reducing signal interference with an adjacent band, and four subbands for direct communication.

22. The method as claimed in claim 21, wherein any 16 tones are allocated for said initial synchronization frequency within each said subband to enable determination of said leaping pattern based on time information.

23. The method as claimed in claim 19, wherein said synchronization packet comprises a packet identification, time and priority information, a transmitter's telephone number, a receiver's telephone number, bands to be used, a leap number, a redundancy region and a check sum.

24. The method as claimed in claim 19, wherein said synchronization identification packet, said flood packet, said flood identification packet, said communication setting packet and said pause packet each comprises: a packet identification, time and priority information, a transmitter's telephone number, a receiver's telephone number, a redundancy region and a check sum.

* * * * *